(12) United States Patent
Takamitsu et al.

(10) Patent No.: US 9,789,476 B2
(45) Date of Patent: Oct. 17, 2017

(54) MFI ZEOLITE HAVING UNIFORM MESOPORES AND METHOD FOR PRODUCING SAME

(71) Applicant: TOSOH CORPORATION, Yamaguchi (JP)

(72) Inventors: Yasuyuki Takamitsu, Yamaguchi (JP); Satoshi Yoshida, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 387 days.

(21) Appl. No.: 14/380,795

(22) PCT Filed: Mar. 25, 2013

(86) PCT No.: PCT/JP2013/002000
§ 371 (c)(1),
(2) Date: Aug. 25, 2014

(87) PCT Pub. No.: WO2013/145687
PCT Pub. Date: Oct. 3, 2013

(65) Prior Publication Data
US 2015/0010468 A1    Jan. 8, 2015

(30) Foreign Application Priority Data
Mar. 26, 2012 (JP) .................. 2012-069976

(51) Int. Cl.
| | |
|---|---|
| *B01J 29/06* | (2006.01) |
| *B01J 29/70* | (2006.01) |
| *C01B 39/40* | (2006.01) |
| *B01J 29/40* | (2006.01) |
| *B01J 35/00* | (2006.01) |
| *B82Y 30/00* | (2011.01) |
| *B01J 35/02* | (2006.01) |
| *B01J 29/04* | (2006.01) |
| *C10G 50/00* | (2006.01) |
| *B01J 35/10* | (2006.01) |

(52) U.S. Cl.
CPC ............. *B01J 29/70* (2013.01); *B01J 29/041* (2013.01); *B01J 29/40* (2013.01); *B01J 35/002* (2013.01); *B01J 35/0013* (2013.01); *B01J 35/023* (2013.01); *B01J 35/108* (2013.01); *B01J 35/1038* (2013.01); *B01J 35/1057* (2013.01); *B01J 35/1061* (2013.01); *B82Y 30/00* (2013.01); *C01B 39/40* (2013.01); *C10G 50/00* (2013.01); *B01J 35/109* (2013.01); *C01P 2004/60* (2013.01); *C01P 2004/64* (2013.01); *C01P 2006/14* (2013.01); *C01P 2006/16* (2013.01); *C01P 2006/17* (2013.01)

(58) Field of Classification Search
CPC ........ B01J 29/40; B01J 29/041; B01J 35/002; B01J 35/023; B01J 35/1038; B01J 35/1057; B01J 35/1061; B01J 35/108; B01J 35/109; C01B 39/40
USPC .............................. 502/60, 77; 423/700, 704
See application file for complete search history.

(56) References Cited

U.S. PATENT DOCUMENTS

| | | | |
|---|---|---|---|
| 6,241,960 | B1 | 6/2001 | Topsøe et al. |
| 6,630,696 | B2 | 10/2003 | Yan et al. |
| 6,669,924 | B1 | 12/2003 | Kaliaguine et al. |
| 2002/0060364 | A1 | 5/2002 | Yan et al. |
| 2002/0134995 | A1 | 9/2002 | Yan et al. |
| 2008/0014140 | A1 | 1/2008 | Christensen et al. |
| 2012/0027673 | A1 | 2/2012 | Larsen et al. |

FOREIGN PATENT DOCUMENTS

| | | |
|---|---|---|
| CN | 1715186 | 1/2006 |
| JP | 61-21985 | 5/1986 |
| JP | 3417944 | 4/2003 |
| JP | 2004-504716 | 2/2004 |
| JP | 2008-19161 | 1/2008 |
| JP | 2009-184888 | 8/2009 |
| JP | 4707800 | 6/2011 |

OTHER PUBLICATIONS

Masami Yamamura et al., "Synthesis of ZSM-5 zeolite with small crystal size and its catalytic performance for ethylene oligomerization", Zeolites, 1994, vol. 14, pp. 643-649.
Jia Wang et al., "TUD-C: A tunable, hierarchically structured mesoporous zeolite composite", Microporous and Mesoporous Materials 120, 2009, pp. 19-28.
"Microporous and Mesoporous Materials", , 2011, pp. 92, vol. 138.
"Microporous and Mesoporous Materials", , 2001, pp. 83, vol. 43.
Search report from International Bureau of WIPO in PCT/JP2013/002000, dated Jun. 25, 2013.
"Microporous and Mesoporous Materials",, 2011, p. 92, vol. 137.

*Primary Examiner* — Elizabeth Wood
(74) *Attorney, Agent, or Firm* — Greenblum & Bernstein, P.L.C.

(57) ABSTRACT

A novel MFI zeolite that when used as a catalyst, can be used for a selective catalytic reaction for larger molecules and provides a method for producing the MFI zeolite. The MFI zeolite includes uniform mesopores having a pore distribution curve which a peak-width thereof at half height (hw) is at most 20 nm (hw≤20 nm) and a center value ($\mu$) of a maximum peak is 10 nm or more and 20 nm or less (10 nm≤$\mu$≤20 nm), and having a pore volume (pv) of the uniform mesopores of at least 0.05 mL/g (0.05 mL/g≤pv); the MFI zeolite has no peak in a range of 0.1° to 3° in powder X-ray diffraction measurement with a diffraction angle represented by 2θ; and the MFI zeolite has an average particle diameter (PD) of at most 100 nm (PD≤100 nm).

5 Claims, 6 Drawing Sheets

MFI ZEOLITE HAVING UNIFORM MESOPORES AND METHOD FOR PRODUCING SAME

TECHNICAL FIELD

The present invention relates to an MFI zeolite having mesopores with a uniform pore diameter and to a method for producing the same.

BACKGROUND ART

MFI zeolites are used as highly selective catalysts that utilize uniform pores originating from the zeolite structure.

However, since the size of the pores of a typical MFI zeolite is less than 1 nm, the size of molecules that can be reacted by using the MFI zeolite as a catalyst is limited. Therefore, researches have been conducted on MFI zeolites that have mesopores (2 to 50 nm) larger than micropores (less than 2 nm) so that the zeolites can serve as a catalyst for use in reactions of larger molecules (see, for example, Non-Patent Literature 1). The required size of mesopores varies depending on the size of reactant molecules. Conventionally, trials have been conducted on the formation of mainly mesopores of less than 10 nm, and only a small number of reports have been made on the formation of mesopores of 10 nm or larger.

Several methods for producing an MFI zeolite having mesopores have been proposed.

For example, in one disclosed method, mesopores are formed by eluting a silica component by alkali treatment (see, for example, Non-Patent Literature 2). However, the formed mesopores were small, less than 10 nm.

In another disclosed method, fine carbon particles are mixed with a zeolite when the zeolite is crystallized. Then the fine carbon particles are removed by firing to thereby form mesopores (see, for example, Patent Literature 1). With this method, the distribution of the pores was broad.

In another disclosed method, mesopores are formed using a surfactant (see, for example, Patent Literature 2). However, only examples in which mesopores with a pore diameter of 2.9 nm were formed with this method were disclosed. When mesopores are formed using a surfactant, ordered pores with adjacent pores separated by walls are formed. These walls hinder migration of materials and adversely affect a catalytic reaction. In addition, the surfactant is expensive, and also the step of removing the surfactant is necessary. These hinder industrialization of the method.

In still another disclosed method, ordered mesopores are formed using a surfactant (see, for example, Patent Literature 3). Also in this method, as in Patent Literature 2, walls separating adjacent pores and acting as obstacles to migration of materials are present in the obtained zeolite.

In another disclosed method, fine crystals of 6 nm are aggregated to form mesopores between the aggregated crystals (see, for example, Non-Patent Literature 1). However, also with this method, the formed mesopores were small, less than 10 nm. Moreover, Patent Literatures 4 to 6 propose other methods for aggregating fine MFI zeolite crystals so that spaces between the crystals are used as mesopores.

CITATION LIST

Patent Literature

[Patent Literature 1] JP2008-19161
[Patent Literature 2] JP2009-184888
[Patent Literature 3] U.S. Pat. No. 6,669,924
[Patent Literature 4] Japanese Examined Patent Application Publication S61-21985
[Patent Literature 5] JP3417944
[Patent Literature 6] JP4707800

Non-Patent Literature

[Non-Patent Literature 1] Microporous and Mesoporous Materials, Vol. 137, p. 92 (2011)
[Non-Patent Literature 2] Microporous and Mesoporous Materials, Vol. 43, p. 83 (2001)

SUMMARY OF INVENTION

Technical Problem

It is an object of the present invention to provide a novel MFI zeolite that when, for example, used as a catalyst, can be used for a selective catalytic reaction for larger molecules and to provide a method for producing the MFI zeolite.

Solution to Problem

Preferably, to support the case where, when an MFI zeolite is used as a catalyst, the reactant is larger molecules (for example, heavy oil or biomolecules such as proteins), the MFI zeolite has mesopores with pore diameters of 10 nm or more. As the pore diameters increase, the distribution of the pore diameters tends to become broad. An MFI zeolite having a broad pore diameter distribution is not preferred in terms of catalytic activity, because the surfaces of the mesopores cannot be used efficiently. Therefore, an MFI zeolite having large mesopores of 10 nm or more and also having a sharper pore diameter distribution is preferred.

The present inventors have conducted extensive studies and found an MFI zeolite having properties (i), (ii), and (iii) described later. The present inventors have also found that the above MFI zeolite functions as a catalyst even in a selective catalytic reaction for larger molecules. Thus, the invention has been completed.

Accordingly, the present invention includes the following aspects.

(1) An MFI zeolite comprising the following properties:
(i) the MFI zeolite includes uniform mesopores having a pore distribution curve which a peak-width thereof at half height (hw) is 20 nm at most (hw≤20 nm) and a center value (μ) of a maximum peak is 10 nm or more and 20 nm or less (10 nm≤μ≤20 nm), and having a pore volume (pv) of the uniform mesopores of at least 0.05 mL/g (0.05 mL/g≤pv);
(ii) the MFI zeolite has no peak in a range of 0.1° to 3° in powder X-ray diffraction measurement with a diffraction angle represented by 2θ; and
(iii) the MFI zeolite has an average particle diameter (PD) of at most 100 nm (PD≤100 nm).

(2) The MFI zeolite according to (1), wherein the peak-width at half height (hw) is 10 nm or less (hw≤10 nm).

(3) The MFI zeolite according to (1) or (2), wherein a ratio (pvr) of the pore volume of the uniform mesopores having the properties shown in (i) with respect to a total pore volume of mesopores is 30% or more and 100% or less (30%≤pvr≤100%).

(4) The MFI zeolite according to any one of (1) to (3), wherein an $SiO_2/Al_2O_3$ molar ratio is 20 or more and 200 or less (20≤$SiO_2/Al_2O_3$ molar ratio≤200).

(5) A method for producing the MFI zeolite according to (1), the method comprising subjecting a raw material composition having the following chemical composition to hydrothermal synthesis:

0.03≤tetrapropylammonium cation/Si molar ratio;
OH/Si molar ratio≤0.22;
20≤SiO$_2$/Al$_2$O$_3$ molar ratio≤300; and
5≤H$_2$O/Si molar ratio≤20.

Advantageous Effects of Invention

According to the present invention, a novel MFI zeolite that when, for example, used as a catalyst, can be used for a selective catalytic reaction for larger molecules can be provided, and a method for producing the MFI zeolite can also be provided.

DESCRIPTION OF EMBODIMENTS

Figure 1:
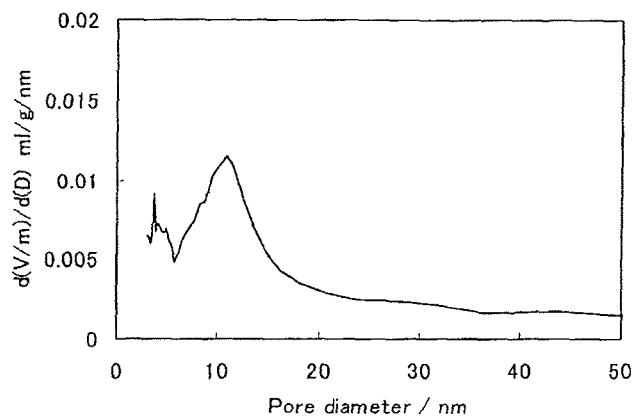
FIG. 1 is a pore distribution curve of an MFI zeolite obtained in Example 1.
Figure 2:
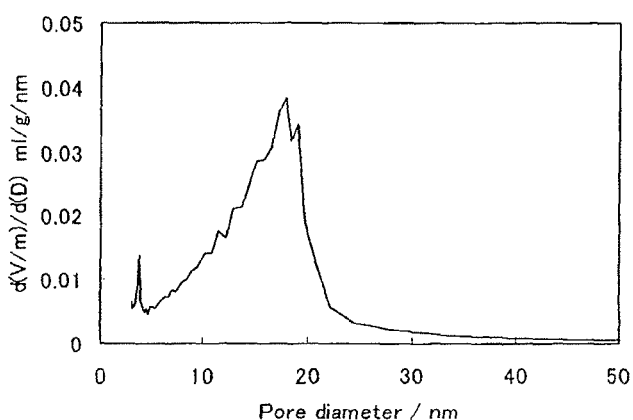
FIG. 2 is a pore distribution curve of an MFI zeolite obtained in Example 2.

An MFI Zeolite in this Embodiment Will Next be Described in detail.

The MFI zeolite in this embodiment has the following properties (i), (ii), and (iii):

(i) the MFI zeolite includes uniform mesopores having a pore distribution curve which a peak-width thereof at half height (hw) is at most 20 nm (hw≤20 nm) and a center value (μ) of a maximum peak is 10 nm or more and 20 nm or less (10 nm≤μ≤20 nm), and having a pore volume (pv) of the uniform mesopores of at least 0.05 mL/g (0.05 mL/g≤pv);

(ii) the MFI zeolite has no peak in a range of 0.1° to 3° in powder X-ray diffraction measurement with a diffraction angle represented by 2θ; and (iii) the MFI zeolite has an average particle diameter (PD) of at most 100 nm (PD≤100 nm).

In the present description, the MFI zeolite is an aluminosilicate compound belonging to structure code MFI defined by the International Zeolite Association.

The mesopores in the present description are mesopores defined by the IUPAC and are pores having a pore diameter of 2 to 50 nm.

Measurement on the mesopores can be performed by a general nitrogen adsorption method at liquid nitrogen temperature. The value of the pore volume of the mesopores can be obtained by analyzing the measurement results obtained by the nitrogen adsorption method. The analysis can be performed using, for example, the following method.

Specifically, the process of desorption is analyzed using a Barret-Joyner-Halenda method (Journal of the American Chemical Society, 1951, pp. 373 to 380). For example, the value of the total pore volume of mesopores can be obtained by integrating the amount of desorbed nitrogen gas in the range corresponding to pore diameters of 2 nm or more and 50 nm or less.

Moreover, a cumulative curve with the vertical axis representing the amount of desorbed nitrogen per unit mass V/m (mL/g) and the horizontal axis representing the diameter D (nm) of mesopores is first obtained. Then the value of the derivative of the amount of nitrogen gas desorbed from the mesopores with respect to the mesopore diameter {d(V/m)/d(D)} is plotted on the vertical axis, and a peak of the increment of the amount of desorbed nitrogen per unit mass with respect to the mesopore diameter can thereby be obtained.

The MFI zeolite in this embodiment includes mesopores with a uniform pore diameter. In the present description, the mesopores with a uniform pore diameter are referred to as uniform mesopores.

More specifically, the uniform mesopores are defined as follows. The maximum one of peaks in the pore distribution curve of mesopores is approximated by a Gaussian function. Then mesopores having pore diameters within the range of the center value (μ) of the Gaussian function plus/minus 2 times the standard deviation (2σ), i.e., (μ±2σ), are referred to as the uniform mesopores.

The MFI zeolite in this embodiment includes, among the uniform mesopores specified by the above definition, uniform mesopores that meet prescribed conditions. Specifically, the MFI zeolite in this embodiment includes uniform mesopores having a pore distribution curve which a peak-width thereof at half height (hw) is at most 20 nm and a center value (μ) of a maximum peak is 10 nm or more and 20 nm or less, and having the pore volume (pv) of the uniform mesopores which is at least 0.05 mL/g.

When the center value (μ) of a Gaussian function approximating the peak in the pore distribution curve of the uniform mesopores is 10 nm or more and 20 nm or less, molecules larger in size than those for conventional MFI zeolites can be selectively reacted.

When the peak-width at half height (hw) of the uniform mesopores is 20 nm or less and preferably 10 nm or less (hw≤10 nm), variations in pore diameter are reduced. Such uniform mesopores with small pore diameter variations contribute to an improvement in reaction selectivity. No particular limitation is imposed on the lower limit of the peak-width at half height of the uniform mesopores, but the peak-width at half height is preferably 1 nm or more. When the peak-width at half height is less than 1 nm, it is difficult to maintain the pore volume and average particle diameter of the uniform mesopores within optimal ranges.

When the pore volume (pv) of the uniform mesopores is less than 0.05 mL/g, the space provided for a reaction is too small. In this case, the amount of the reactant introduced into the pores becomes small, so that no catalytic effect is obtained. From the viewpoint of increasing the space for the catalytic reaction, the pore volume of the uniform mesopores is preferably 0.10 mL/g or more (0.10 mL/g≤pv) and more preferably 0.20 mL/g or more (0.20 mL/g≤pv). No particular limitation is imposed on the upper limit of the pore volume of the uniform mesopores, but the pore volume is preferably 0.70 mL/g or less and more preferably 0.50 mL/g or less. When the pore volume exceeds 0.70 mL/g, physical strength deteriorates, and this causes deterioration of handleability.

The pore volume of the uniform mesopores can be determined by integrating the amount of desorbed nitrogen gas in the range of $\mu \pm 2\sigma$.

No particular limitation is imposed on the ratio (pvr) of the pore volume of the uniform mesopores having the properties shown in (i) to the total pore volume of the mesopores. However, the ratio is preferably 30% or more (30%≤pvr≤100%) and more preferably 40% or more (40%≤pvr≤100%). When the ratio is 30% or more, the reaction can be performed more selectively.

The average particle diameter (PD) of the MFI zeolite in this embodiment is at most 100 nm (PD≤100 nm). This is because of the following reason. Since the uniform mesopores are formed in spaces between crystal particles, the spaces become larger than the range of the mesopores (2 to 50 nm) when the particle diameter is larger than 100 nm, and therefore uniform mesopores are not formed. No particular limitation is imposed on the lower limit of the particle diameter, but the particle diameter is preferably 3 nm or more and more preferably 5 nm or more. If the particle diameter is less than 3 nm, heat resistance is lowered, and catalytic performance deteriorates.

The average diameter of the particles in this embodiment can be determined from their outer surface area using the following formula (1).

[Formula 1]

$$PD = \frac{6}{S}\left(\frac{1}{2.29 \times 10^6} + 0.18 \times 10^{-6}\right) \quad (1)$$

In the formula (1), S is the outer surface area (m²/g), and PD is the average particle diameter (m).

The outer surface area (S(m²/g)) in the formula (1) can be determined by a t-plot method using a general nitrogen adsorption method at liquid nitrogen temperature. The t-plot method is a method of determining the outer surface area, wherein, for example, measurement points of the thickness t of the adsorption layer in the range of 0.6 to 1 nm are approximated by a straight line, and the gradient of the obtained regression line is used to determine the outer surface area.

In another method of measuring the particle diameter of the MFI zeolite, 10 or more particles in a scanning electron microscope (SEM) or transmission electron microscope (TEM) photograph are arbitrarily selected, and the average surface area diameter of these particles is determined.

The particle diameters obtained by different particle diameter measurement methods may be different. However, it is expected that, when the average particle diameter determined using the above formula (1) falls within the range of 100 nm or less, which is the range of the average particle diameter of the MFI zeolite in this embodiment, the MFI zeolite is suitable for a selective catalytic reaction for larger molecules.

Since the mesopores are formed between the crystal particles, the arrangement of the mesopores is not ordered. Therefore, when the MFI zeolite in this embodiment is analyzed by powder X-ray diffraction (diffraction angle: 2θ) in the range of 0.1° to 3° (on a small-angle side), no peak is detected. In the MFI zeolite in this embodiment, since no walls separating the mesopores are present, migration of a material between the mesopores is easy.

No particular limitation is imposed on the $SiO_2/Al_2O_3$ molar ratio in the MFI zeolite in this embodiment, but the $SiO_2/Al_2O_3$ molar ratio is preferably 20 or more and 200 or less. When the ratio is less than 20, thermal stability becomes insufficient and the peak-width at half height of the uniform mesopores becomes larger than that when the ratio is within the above range. An $SiO_2/Al_2O_3$ molar ratio exceeding 200 is not preferred because the ratio of the uniform mesopores with respect to all the mesopores becomes smaller than that when the ratio is within the above range.

No particular limitation is imposed on the aggregation diameter (PS) of the MFI zeolite in this embodiment, but the aggregation diameter is preferably 1 μm or more and 100 μm or less (1 μm≤PS≤100 μm). This is because, when the aggregation diameter is much below the above range, solid-liquid separation after crystallization is more difficult and because, when the aggregation diameter is much above the above range, the workability of powder becomes worse.

The aggregation diameter is the average diameter of aggregates formed by aggregation of particles observed in the above-described SEM photograph. The aggregation diameter is measured by a dynamic scattering method and represented by a volume average diameter.

The MFI zeolite in this embodiment may contain, in its pores, a structure directing agent such as a tetrapropylammonium salt. Since the structure directing agent such as a tetrapropylammonium salt is present in the micropores, the state of the mesopores is not affected by the structure directing agent. However, when the structure directing agent is present in the micropores, these micropores cannot be utilized. Therefore, when the MFI zeolite is used as a catalyst for a reaction utilizing the micropores, it is preferable that no structure directing agent be contained.

<Method for Producing MFI Zeolite in this Embodiment>

The MFI zeolite in this embodiment can be produced by hydrothermal synthesis of a raw material composition containing water, a tetrapropylammonium salt, hydroxide ions, a compound used as a silica source (hereinafter may be referred to simply as a silica source), and a compound used as an alumina source (hereinafter may be referred to simply as an alumina source). The raw material composition has the following chemical composition:

0.03≤tetrapropylammonium cation/Si molar ratio,
OH/Si molar ratio≤0.22,
20≤$SiO_2/Al_2O_3$ molar ratio≤300, and
5≤$H_2O$/Si molar ratio≤20.

The raw material composition contains a tetrapropylammonium salt. The amount of the tetrapropylammonium salt in the raw material composition, i.e., the tetrapropylammonium cation/Si molar ratio, is 0.03 or more. If the amount of the tetrapropylammonium salt in the raw material composition is less than 0.03, an MFI zeolite having uniform mesopores is not obtained. No particular limitation is imposed on the upper limit of the tetrapropylammonium cation/Si molar ratio, but the amount of the tetrapropylammonium salt in the raw material composition, i.e., the tetrapropylammonium cation/Si molar ratio, is preferably 0.5 or less, from the economical point of view.

The OH/Si molar ratio in the raw material composition is 0.22 or less. If the OH/Si molar ratio exceeds 0.22, the pore diameters of the mesopores of the obtained MFI zeolite become non-uniform. No particular limitation is imposed on the lower limit of the OH/Si molar ratio, but the OH/Si molar ratio is preferably 0.05 or more. If the OH/Si molar ratio is lower than 0.05, crystallization is slowed down, and industrial productivity deteriorates.

The raw material composition may contain an alkali metal. No particular limitation is imposed on the type of the alkali metal, but the alkali metal is preferably Na. When the raw material composition contains an alkali metal, the amount of the alkali metal, i.e., an alkali metal/Si molar ratio, is preferably 0.20 or less (the alkali metal/Si molar ratio≤0.20). When the alkali metal/Si molar ratio exceeds 0.20, crystallization is slowed down, and therefore it is difficult to industrially produce the MFI zeolite.

The $SiO_2/Al_2O_3$ molar ratio in the raw material composition is preferably 20 or more and 300 or less. When the $SiO_2/Al_2O_3$ molar ratio in the raw material composition is within the above range, an MFI zeolite with the $SiO_2/Al_2O_3$ molar ratio within a preferred range can be obtained.

The $H_2O$/Si molar ratio in the raw material composition is 5 or more and 20 or less and preferably 5 or more and 15 or less (5≤$H_2O$/Si molar ratio≤15). If the $H_2O$/Si molar ratio exceeds 20, coarse crystals are formed, and an MFI zeolite having mesopores cannot be obtained. If the $H_2O$/Si molar ratio is less than 5, the viscosity of the raw material composition becomes high, and therefore, the raw material composition cannot be stirred sufficiently, so that the raw material composition is not reacted uniformly.

No particular limitation is imposed on the silica source contained in the raw material composition. Examples of the silica source may include an aqueous sodium silicate solution, precipitated silica, colloidal silica, fumed silica, aluminosilicate gel, silicon alkoxides such as tetraethoxysilane, and Y-type zeolites. One of the above compounds or a mixture of two or more thereof may be used.

No particular limitation is imposed on the alumina source contained in the raw material composition. Examples of the alumina source may include aluminum hydroxide, aluminum oxide, aluminum sulfate, aluminum chloride, aluminum nitrate, aluminosilicate gel, metal aluminum, and Y-type zeolites. One of the above compounds or a mixture of two or more types may be used.

No particular limitation is imposed on the hydroxide ions contained in the raw material composition. Preferred examples of the hydroxide ions may include a hydroxide ion with a structure directing agent as a counter cation, such as a hydroxide ion originating from, for example, tetrapropylammonium hydroxide.

Preferred examples of the hydroxide ions contained in the raw material composition may include hydroxide ions with alkali metal cations and alkaline-earth metal cations as counter cations. A liquid such as an aqueous solution may be used as the source of hydroxide ions, or a solid such as sodium hydroxide pellets may be used.

In the production method in this embodiment, the raw material composition may contain an MFI zeolite as seed crystals.

The amount of the seed crystals contained is preferably 0.5% by weight or more with respect to the weight of $SiO_2$ and $Al_2O_3$ in the raw material composition. If the content of the seed crystals is 0.5% by weight or more, the reaction rate becomes fast.

The weight of $SiO_2$ and $Al_2O_3$ in the raw material composition is the sum of the weight of $SiO_2$ when Si in the raw material composition is assumed to be in the form of $SiO_2$ and the weight of $Al_2O_3$ when Al in the raw material composition is assumed to be in the form of $Al_2O_3$. Therefore, when, for example, silica sol is used as the silica source and aluminum hydroxide is used as the alumina source, the weight of Si in the silica sol is determined in terms of the weight of $SiO_2$, and the weight of Al in the aluminum hydroxide is determined in terms of the weight of $Al_2O_3$. Then these are added, and the sum is used as the weight of $SiO_2$ and $Al_2O_3$ in the raw material composition. When a raw material composition containing, in addition to the silica source and the alumina source, a material containing Si or Al is used, the weight of $SiO_2$ and $Al_2O_3$ in the raw material composition is computed on the basis of the silica source, the alumina source, and the material that contains Si or Al and is other than the silica source and the alumina source.

By subjecting such a raw material composition to hydrothermal synthesis, the MFI zeolite in this embodiment can be produced. Any method can be used for the hydrothermal synthesis, and no particular limitation is imposed on the method. Preferred examples of the hydrothermal synthesis method may include a hydrothermal synthesis method in which the raw material composition is held at a temperature of 50 to 200° C. under autogenous pressure. The temperature during holding is preferably 50 to 150° C. and more preferably 70 to 120° C.

No particular limitation is imposed on the applications of the MFI zeolite in this embodiment. For example, the MFI zeolite can be used as a catalyst for a selective catalytic reaction.

The selective catalytic reaction is a reaction that uses a catalyst to allow a specific compound to be selectively synthesized or uses a catalyst to allow a specific reactant to be selectively reacted.

Since the MFI zeolite in this embodiment has the above-described properties (i), (ii), and (iii), the MFI zeolite can be used also for a selective catalytic reaction for molecules larger, compared to those for conventional MFI zeolites and therefore can serve as a useful catalyst.

The MFI zeolite in this embodiment is also useful when not only reactant molecules but also byproduct molecules generated are large. For example, in a reaction of a polymerizable low-molecular weight material, the pores may be clogged with the polymerized product, and this may cause deactivation of the catalyst. However, the MFI zeolite with uniform mesopores has a feature in that the pores are less likely to be clogged because diffusion of the polymerized product is fast.

EXAMPLES

The MFI zeolite in the above embodiment will next be described by way of Examples, but the present invention is not limited to these Examples.

(Measurement of Pore Distribution, Pore Diameter, and Outer Surface Area)

The pore distribution and pore diameter of a sample were determined by nitrogen adsorption measurement.

A general nitrogen adsorption apparatus (product name: OMNISORP 360CX, manufactured by Beckman Coulter) was used for the nitrogen adsorption measurement, and the adsorption measurement and also desorption measurement were performed under the condition of 30 torr/step. The outer surface area was determined by linear approximation of the thickness of an adsorption layer in the range of t=0.6 to 1.0 nm using the t-plot method.

The desorption process in the nitrogen adsorption measurement was analyzed by a Barret-Joyner-Halenda method (Journal of the American Chemical Society, 1951, pp. 373 to 380) to obtain a pore distribution curve of mesopores with the horizontal axis representing the pore diameter plotted on a linear scale and the vertical axis representing the derivative of the amount of desorbed nitrogen gas.

The total pore volume of the mesopores was determined by integrating the amount of adsorbed nitrogen gas in the range of 2 nm or more and 50 nm or less.

Peakfit (ver.4.12) from HULINKS was used to analyze the pore distribution curve. The maximum one of peaks of the derivative of the amount of nitrogen gas desorbed from the mesopores with respect to the mesopore diameter (d(V/m)/d(D) was analyzed using intensity approximation with a Gaussian function. Mesopores having diameters within the range of the center value ($\mu$) of the Gaussian function plus/minus 2 times the standard deviation ($2\sigma$), i.e., ($=\mu \pm 2\sigma$), were defined as uniform mesopores.

The pore volume of the uniform mesopores was determined by integrating the amount of desorbed nitrogen gas in the range of the center value ($\mu$) plus/minus $2\sigma$.

(Measurement of Average Particle Diameter)

The average particle diameter was computed from the outer surface area using the following formula (1).

[Formula 2]

$$PD = \frac{6}{S}\left(\frac{1}{2.29 \times 10^6} + 0.18 \times 10^{-6}\right) \quad (1)$$

In the formula (1), S is the outer surface area ($m^2/g$), and PD is the average particle diameter (m). The outer surface area (S ($m^4/g$)) in the formula (1) can be determined by the t-plot method using a general nitrogen adsorption method at liquid nitrogen temperature. The t-plot method is a method of determining the outer surface area. More specifically, for example, measurement points of the thickness t of the adsorption layer in the range of 0.6 to 1 nm are approximated by a straight line, and the gradient of the obtained regression line is used to determine the outer surface area.

(Measurement of $SiO_2/Al_2O_3$ Molar Ratio)

The $SiO_2/Al_2O_3$ molar ratio in the MFI zeolite was obtained as follows. The MFI zeolite was dissolved in a mixed aqueous solution of hydrofluoric acid and nitric acid, and the obtained solution was subjected to measurement by inductively coupled plasma atomic emission spectroscopic (ICP-AES) analysis using a general ICP apparatus (product name: OPTIMA3300DV, manufactured by Perkin Elmer).

(Measurement of Aggregation Diameter)

The volume average diameter (D50) of the diameters of aggregated particles in a sample was measured as an aggregation diameter by a dynamic diffraction method. Microtrac HRA (Model 9320-+100) manufactured by NIKKISO Co., Ltd. was used for the measurement. In the measurement, the refractive index of the particles was 1.66, and transparent non-spherical particles were used as the settings for the particles. The liquid refractive index of a solvent was 1.33.

(Powder X-Ray Diffraction Measurement)

Measurement was performed with CuK$\alpha$1 in air using X' Pert Pro MPD manufactured by Spectris Co., Ltd. at a tube voltage of 45 kV and a tube current of 40 mA. The range of 0.04° to 5° was analyzed at 0.08°/step and 200 sec/step. A background corrected by the absorption rate of a direct beam was subtracted.

The presence or absence of a peak can be determined visually or may be determined using a peak search program. Any general program can be used as the peak search program. For example, the determination that there is a peak can be made as follows. The measurement results with the horizontal axis representing $2\theta[°]$ and the vertical axis representing intensity [a.u.] are smoothened using a SAVITSKY & GOLAY formula and a sliding polynomial filter and then differentiated two times. When three or more negative values occur successively in the secondary differentiated measurement results, the determination is made that there is a peak.

Example 1

Aluminum hydroxide was dissolved in an aqueous solution of tetrapropylammonium (hereinafter referred to as "TPA") hydroxide and sodium hydroxide. Tetraethoxysilane was mixed with the obtained aqueous solution to form a suspension. An MFI zeolite (HSZ860NHA, manufactured by TOSOH Corporation) serving as seed crystals was added to the obtained suspension to prepare a raw material composition.

The amount of the seed crystals added was 0.7% by weight with respect to the weight of $Al_2O_3$ and $SiO_2$ in the raw material composition. In the following Examples and Comparative Examples, the type of the seed crystals and the amount added of the seed crystals are the same as those in Example 1.

Ethanol generated in the raw material composition was removed by evaporation.

The chemical composition of the raw material composition was as follows:

$SiO_2/Al_2O_3$ molar ratio=44,TPA/Si molar ratio=0.07,
Na/Si molar ratio=0.14,OH/Si molar ratio=0.21,
and $H_2O$/Si molar ratio=10.

The obtained raw material composition was sealed in a stainless steel-made autoclave and then subjected to crystallization at 115° C. for 4 days under stirring to obtain a slurry-like solution mixture. The slurry-like solution mixture after crystallization was subjected to solid-liquid separation using a centrifugal settler, and then the solid particles were washed with a sufficient amount of pure water and dried at 110° C. to obtain a dried powder.

10 g of the obtained dried powder was fired at 550° C. for 1 hour. Then the fired powder was subjected to exchange in 100 mL of a 20 wt % aqueous ammonium chloride solution at 60° C. for 20 hours, then filtrated, and washed to thereby prepare an ammonium-type MFI zeolite. Then the ammonium-type MFI zeolite was fired at 550° C. for 1 hour to obtain an MFI zeolite.

The average particle diameter of the obtained MFI zeolite was 43 nm, and its $SiO_2/Al_2O_3$ molar ratio was 39. The total pore volume of mesopores in the obtained MFI zeolite was 0.19 mL/g.

The peak-width at half height of uniform mesopores in the pore distribution curve of the obtained MFI zeolite was 5 nm, and the center value of the peak was 11 nm. The pore volume of the uniform mesopores was 0.08 mL/g. The ratio of the pore volume of the uniform mesopores to the total pore volume of the mesopores in the MFI zeolite was 44%.

The chemical composition of the raw material composition and the results of evaluation of the MFI zeolite are shown in TABLE 1.

Example 2

Amorphous aluminosilicate gel was added to and suspended in an aqueous solution of TPA hydroxide and sodium hydroxide. An MFI zeolite (HSZ860NHA, manufactured by TOSOH Corporation) serving as seed crystals was added to the obtained suspension to prepare a raw material composition.

The chemical composition of the raw material composition was as follows:

$SiO_2/Al_2O_3$ molar ratio=44,TPA/Si molar ratio=0.05, Na/Si molar ratio=0.16,OH/Si molar ratio=0.21, and $H_2O$/Si molar ratio=10.

This raw material composition was reacted and treated in the same manner as in Example 1 to obtain an MFI zeolite. The average particle diameter of the obtained MFI zeolite was 27 nm, its $SiO_2/Al_2O_3$ molar ratio was 40, and its aggregation diameter was 46 μm. The total pore volume of mesopores present in the obtained MFI zeolite was 0.39 mL/g.

The peak-width at half height of uniform mesopores in the pore distribution curve of the obtained MFI zeolite was 9 nm, and the center value of the peak was 16 nm. The pore volume of the uniform mesopores was 0.31 mL/g, and the ratio of the pore volume of the uniform mesopores to the total pore volume of the mesopores was 78%.

The chemical composition of the raw material composition and the results of evaluation of the MFI zeolite are shown in TABLE 1.

Figure 3:
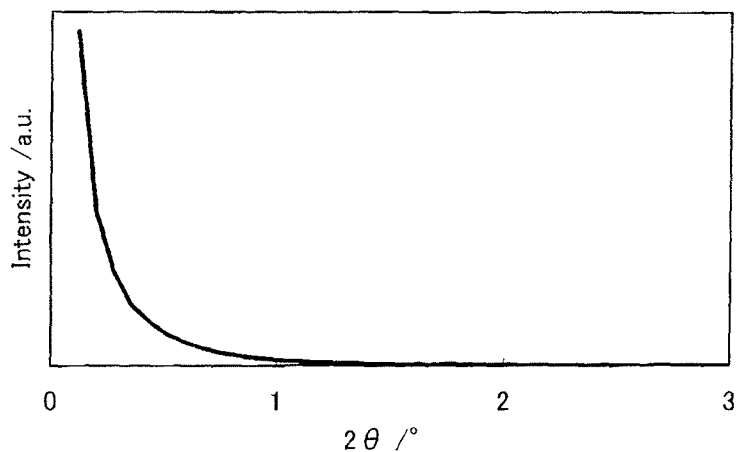
FIG. 3 shows powder X-ray diffraction of the MFI zeolite obtained in Example 2.
Figure 4:
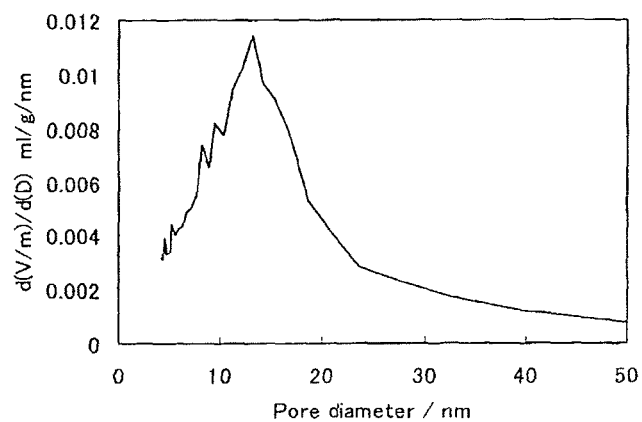
FIG. 4 is a pore distribution curve of an MFI zeolite obtained in Example 3.

The powder X-ray diffraction diagram of the obtained MFI zeolite is shown in FIG. 3. No peak is present in the range of 0.1° to 3°, and this shows that the mesopores are connected randomly.

Example 3

Aluminum hydroxide was dissolved in an aqueous solution of TPA hydroxide and sodium hydroxide. Tetraethoxysilane was mixed with the obtained aqueous solution to form a suspension. An MFI zeolite serving as seed crystals was added to the obtained suspension to prepare a raw material composition. Ethanol generated was removed by evaporation.

The chemical composition of the raw material composition was as follows:

$SiO_2/Al_2O_3$ molar ratio=128,TPA/Si molar ratio=0.05,Na/Si molar ratio=0.16,OH/Si molar ratio=0.21, and $H_2O$/Si molar ratio=10.

This raw material composition was reacted and treated in the same manner as in Example 1 to obtain an MFI zeolite. The average particle diameter of the obtained MFI zeolite was 47 nm, its $SiO_2/Al_2O_3$ molar ratio was 97, and its aggregation diameter was 2 μm. The total pore volume of mesopores present in the obtained MFI zeolite was 0.21 mL/g.

The peak-width at half height of uniform mesopores in the pore distribution curve of the obtained MFI zeolite was 9 nm, and the center value of the peak was 13 nm. The pore volume of the uniform mesopores was 0.13 mL/g, and the ratio of the pore volume of the uniform mesopores to the total pore volume of the mesopores was 63%.

The chemical composition of the raw material composition and the results of evaluation of the MFI zeolite are shown in TABLE 1.

Figure 5:
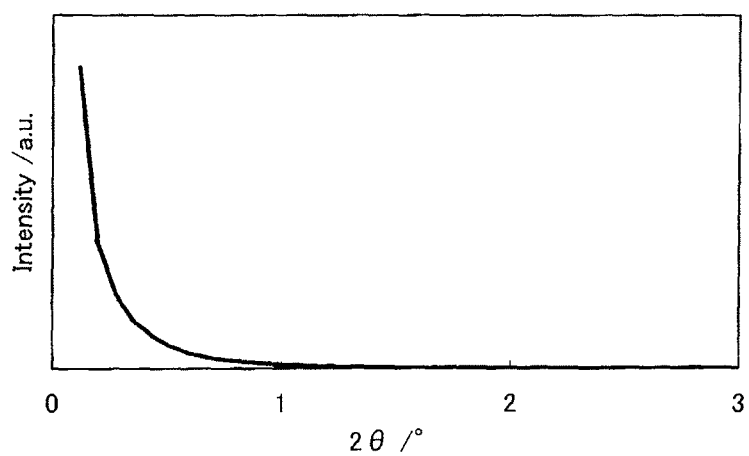
FIG. 5 shows powder X-ray diffraction of the MFI zeolite obtained in Example 3.

The powder X-ray diffraction diagram of the obtained MFI zeolite is shown in FIG. 5. No peak is present in the range of 0.1° to 3°, and this shows that the mesopores are connected randomly.

Example 4

Aluminum hydroxide was dissolved in an aqueous solution of TPA bromide and sodium hydroxide. Tetraethoxysilane was added to the obtained aqueous solution to form a suspension. An MFI zeolite serving as seed crystals was added to the obtained suspension to prepare a raw material composition. Ethanol generated was removed by evaporation.

The chemical composition of the raw material composition was as follows:

$SiO_2/Al_2O_3$ molar ratio=63,TPA/Si molar ratio=0.05, Na/Si molar ratio=0.17,OH/Si molar ratio=0.17, and $H_2O$/Si molar ratio=10.

This raw material composition was reacted and treated in the same manner as in Example 1 to obtain an MFI zeolite. The average particle diameter of the obtained MFI zeolite was 57 nm, and its $SiO_2/Al_2O_3$ molar ratio was 62. The total pore volume of mesopores present in the obtained MFI zeolite was 0.14 mL/g.

The peak-width at half height of uniform mesopores in the pore distribution curve of the obtained MFI zeolite was 6 nm, and the center value of the peak was 10 nm. The pore volume of the uniform mesopores was 0.16 mL/g, and the ratio of the pore volume of the uniform mesopores to the total pore volume of the mesopores was 44%. The average diameter of particle observed under a transmission electron microscope (TEM) was 37 nm.

The chemical composition of the raw material composition and the results of evaluation of the MFI zeolite are shown in TABLE 1.

Figure 6:
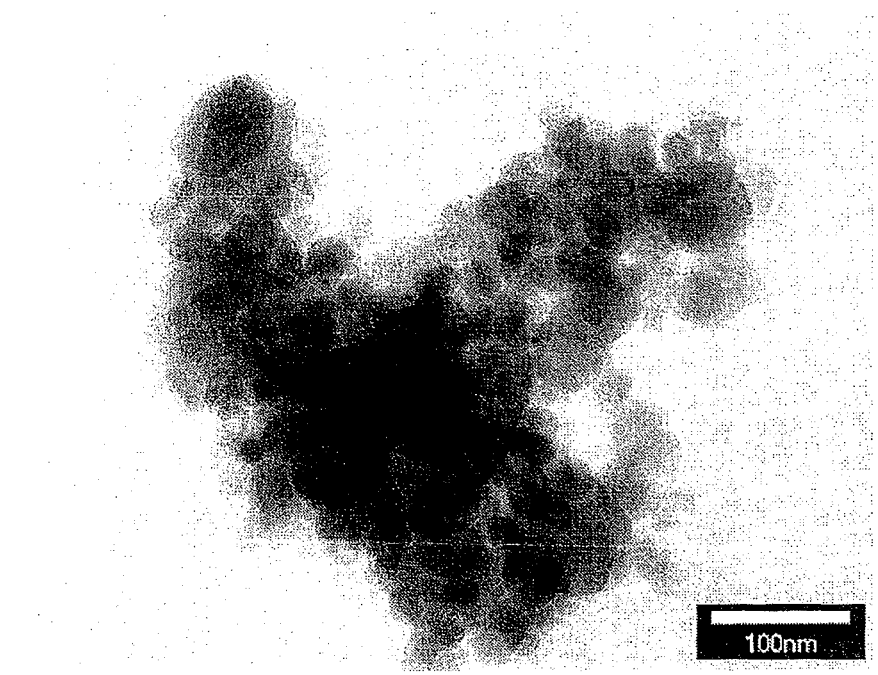
FIG. 6 is a TEM observation image of an MFI zeolite obtained in Example 4.
Figure 7:
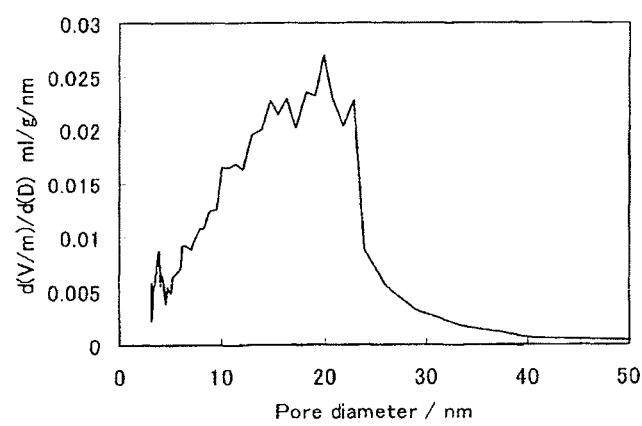
FIG. 7 is a pore distribution curve of an MFI zeolite obtained in Example 6.
Figure 8:
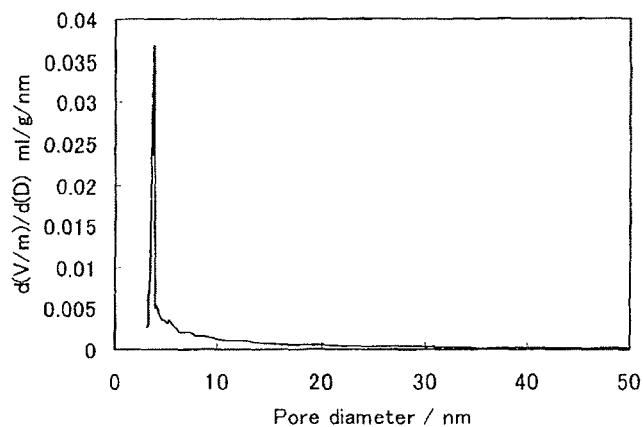
FIG. 8 is a pore distribution curve of an MFI zeolite obtained in Comparative Example 1.
Figure 9:
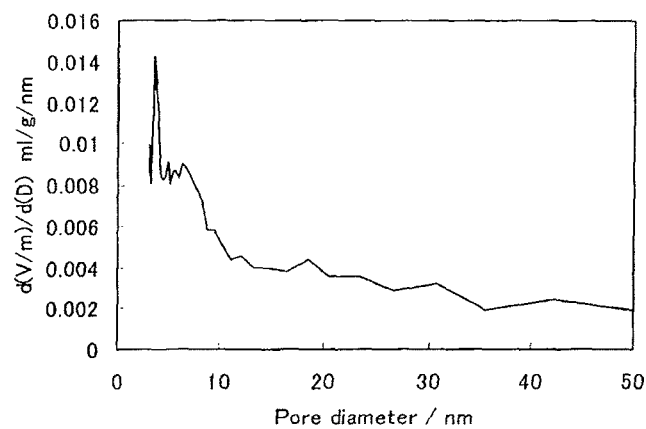
FIG. 9 is a pore distribution curve of an MFI zeolite obtained in Comparative Example 3.
Figure 10:
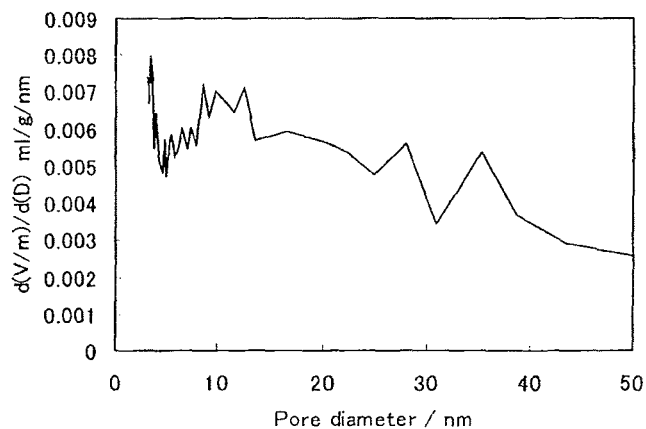
FIG. 10 is a pore distribution curve of an MFI zeolite obtained in Comparative Example 4.
Figure 11:
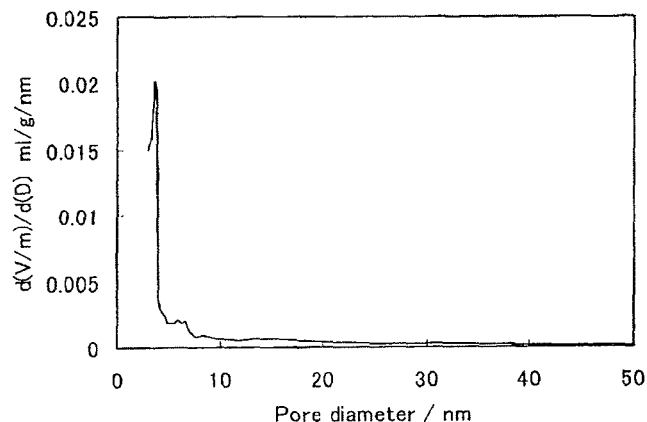
FIG. 11 is a pore distribution curve of an MFI zeolite obtained in Comparative Example 5.
Figure 12:
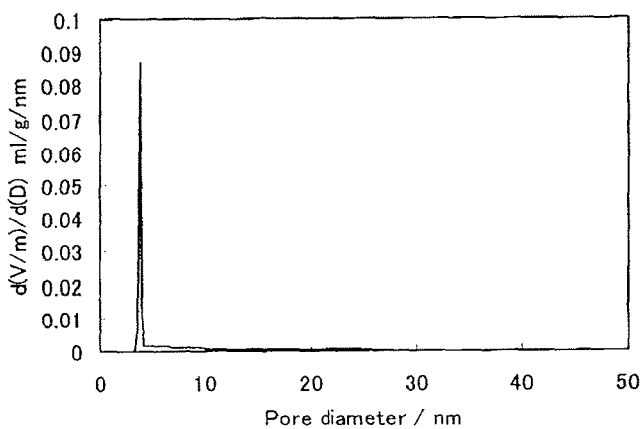
FIG. 12 is a pore distribution curve of an MFI zeolite obtained in Comparative Example 6.

A TEM image of the obtained MFI zeolite is shown in FIG. 6. An aggregate of fine crystals of 100 nm or less is shown, and no walls separating mesopores and no ordered arrangement of the mesopores are observed.

Example 5

Aluminum hydroxide was dissolved in an aqueous solution of TPA bromide and sodium hydroxide. Tetraethoxysilane was added to the obtained aqueous solution, and then an MFI zeolite serving as seed crystals was added to the resultant aqueous solution to prepare a raw material composition. Ethanol generated was removed by evaporation.

The chemical composition of the raw material composition was as follows:

$SiO_2/Al_2O_3$ molar ratio=113,TPA/Si molar ratio=0.05,Na/Si molar ratio=0.17,OH/Si molar ratio=0.17, and $H_2O$/Si molar ratio=10.

This raw material composition was reacted and treated in the same manner as in Example 1 to obtain an MFI zeolite. The average particle diameter of the obtained MFI zeolite was 46 nm, and its $SiO_2/Al_2O_3$ molar ratio was 98. The total pore volume of mesopores present in the obtained MFI zeolite was 0.19 mL/g.

The peak-width at half height of uniform mesopores in the pore distribution curve of the obtained MFI zeolite was 6 nm, and the center value of the peak was 11 nm. The pore volume of the uniform mesopores was 0.11 mL/g. The ratio of the pore volume of the uniform mesopores to the total pore volume of the mesopores was 56%.

The chemical composition of the raw material composition and the results of evaluation of the MFI zeolite are shown in TABLE 1.

Example 6

Aluminum hydroxide was dissolved in an aqueous solution of TPA bromide and sodium hydroxide. Tetraethoxysilane was added to the obtained aqueous solution, and then an MFI zeolite serving as seed crystals was added to the resultant aqueous solution to prepare a raw material composition. Ethanol generated was removed by evaporation.

The chemical composition of the raw material composition was as follows:

$SiO_2/Al_2O_3$ molar ratio=28,TPA/Si molar ratio=0.05, Na/Si molar ratio=0.17,OH/Si molar ratio=0.17, and $H_2O$/Si molar ratio=10.

This raw material composition was reacted and treated in the same manner as in Example 1 to obtain an MFI zeolite. The average particle diameter of the obtained MFI zeolite was 26 nm, and its $SiO_2/Al_2O_3$ molar ratio was 26. The total pore volume of mesopores present in the obtained MFI zeolite was 0.42 mL/g.

The peak-width at half height of uniform mesopores in the pore distribution curve of the obtained MFI zeolite was 15 nm, and the center value of the peak was 17 nm. The pore volume of the uniform mesopores was 0.39 mL/g, and the ratio of the pore volume of the uniform mesopores to the total pore volume of the mesopores was 92%.

The chemical composition of the raw material composition and the results of evaluation of the MFI zeolite are shown in TABLE 1.

Comparative Example 1

Aluminum hydroxide was dissolved in an aqueous solution of sodium hydroxide. Tetraethoxysilane was added to the obtained aqueous solution to form a suspension. An MFI zeolite serving as seed crystals was added to the obtained suspension to prepare a raw material composition. Ethanol generated was removed by evaporation.

The chemical composition of the raw material composition was as follows:

$SiO_2/Al_9O_2$ molar ratio=48, Na/Si molar ratio=0.18, OH/Si molar ratio=0.18, and $H_2O$/Si molar ratio=18.

This raw material composition was reacted and treated in the same manner as in Example 1 except that the crystallization temperature was set to 180° C. to thereby obtain an MFI zeolite. The average particle diameter of the obtained MFI zeolite was 115 nm, and its $SiO_2/Al_2O_3$ molar ratio was 42. The total pore volume of mesopores present in the obtained MFI zeolite was 0.05 mL/g.

The peak-width at half height of uniform mesopores in the pore distribution curve of the obtained MFI zeolite was 0.3 nm, and the center value of the peak was 4 nm. The pore volume of the uniform mesopores was 0.01 mL/g, and the ratio of the pore volume of the uniform mesopores to the total pore volume of the mesopores was 26%.

The chemical composition of the raw material composition and the results of evaluation of the MFI zeolite are shown in TABLE 1.

Comparative Example 2

Aluminum hydroxide was dissolved in an aqueous solution of TPA hydroxide and sodium hydroxide. Tetraethoxysilane was added to the obtained aqueous solution, and then an MFI zeolite serving as seed crystals was added to the resultant aqueous solution to prepare a raw material composition. Ethanol generated was removed by evaporation.

The chemical composition of the raw material composition was as follows:

$SiO_2/Al_2O_3$ molar ratio=59,TPA/Si molar ratio=0.15, Na/Si molar ratio=0.11,OH/Si molar ratio=0.26, and $H_2O$/Si molar ratio=10.

This raw material composition was reacted and treated in the same manner as in Example 1 to obtain an MFI zeolite. The average particle diameter of the obtained MFI zeolite was 60 nm, and its $SiO_2/Al_2O_3$ molar ratio was 48. The total pore volume of mesopores present in the obtained MFI zeolite was 0.17 mL/g.

The peak-width at half height of uniform mesopores in the obtained pore distribution curve was 32 nm, and the center value of the peak was 25 nm. The pore volume of the uniform mesopores was 0.17 mL/g, and the ratio of the pore volume of the uniform mesopores to the total pore volume of the mesopores was 100%. The peak of the mesopores was very broad, and only the uniform mesopores with a large peak-width at half height were formed.

The chemical composition of the raw material composition and the results of evaluation of the MFI zeolite are shown in TABLE 1.

Comparative Example 3

Aluminum hydroxide was dissolved in an aqueous solution of TPA hydroxide and sodium hydroxide. Tetraethoxysilane was added to the obtained aqueous solution to form a suspension. An MFI zeolite serving as seed crystals was added to the obtained suspension to prepare a raw material composition. Ethanol generated was removed by evaporation.

The chemical composition of the raw material composition was as follows:

$SiO_2/Al_2O_3$ molar ratio=59,TPA/Si molar ratio=0.20, Na/Si molar ratio=0.06,OH/Si molar ratio=0.26, and $H_2O$/Si molar ratio=10.

This raw material composition was reacted and treated in the same manner as in Example 1 to obtain an MFI zeolite. The average particle diameter of the obtained MFI zeolite was 42 nm, and its $SiO_2/Al_2O_3$ molar ratio was 49. The total pore volume of mesopores present in the obtained MFI zeolite was 0.20 mL/g.

The peak-width at half height of uniform mesopores in the pore distribution curve of the obtained MFI zeolite was 3 nm, and the center value of the peak was 6 nm. The pore volume of the uniform mesopores was 0.04 mL/g, and the ratio of the pore volume of the uniform mesopores to the total pore volume of the mesopores was 23%.

The chemical composition of the raw material composition and the results of evaluation of the MFI zeolite are shown in TABLE 1.

Comparative Example 4

Aluminum hydroxide was dissolved in an aqueous solution of TPA hydroxide and sodium hydroxide. Tetraethoxysilane was added to the obtained aqueous solution to form a suspension. An MFI zeolite serving as seed crystals was added to the obtained suspension to prepare a raw material composition. Ethanol generated was removed by evaporation.

The chemical composition of the raw material composition was as follows:

SiO$_2$/Al$_2$O$_3$ molar ratio=59,TPA/Si molar ratio=0.20, Na/Si molar ratio=0.11,OH/Si molar ratio=0.31, and H$_2$O/Si molar ratio=10.

This raw material composition was reacted and treated in the same manner as in Example 1 to obtain an MFI zeolite. The average particle diameter of the obtained MFI zeolite was 42 nm, and its SiO$_2$/Al$_2$O$_3$ molar ratio was 44. The total pore volume of mesopores present in the obtained MFI zeolite was 0.25 mL/g.

The peak-width at half height of uniform mesopores in the pore distribution curve of the obtained MFI zeolite was 40 nm, and the center value of the peak was 13 nm. The volume of the uniform mesopores was 0.23 mL/g, and the ratio of the pore volume of the uniform mesopores to the total pore volume of the mesopores was 93%. The peak of the mesopores was very broad, and only the uniform mesopores with a large peak-width at half height were formed.

Comparative Example 5

Aluminum hydroxide was dissolved in an aqueous solution of TPA bromide and sodium hydroxide. Tetraethoxysilane was added to the obtained aqueous solution to form a suspension. An MFI zeolite serving as seed crystals was added to the obtained suspension to prepare a raw material composition. Ethanol generated was removed by evaporation.

The chemical composition of the raw material composition was as follows:

SiO$_2$/Al$_2$O$_3$ molar ratio=285,TPA/Si molar ratio=0.05,Na/Si molar ratio=0.17,OH/Si molar ratio=0.17, and H$_2$O/Si molar ratio=10.

This raw material composition was reacted and treated in the same manner as in Example 1 to obtain an MFI zeolite. The average particle diameter of the obtained MFI zeolite was 46 nm, its SiO$_2$/Al$_2$O$_3$ molar ratio was 217, and its aggregation diameter was 7 μm. The total pore volume of mesopores present in the obtained MFI zeolite was 0.04 mL/g. No uniform mesopores were found in the mesopores.

The chemical composition of the raw material composition and the results of evaluation of the MFI zeolite are shown in TABLE 1.

Comparative Example 6

Aluminum hydroxide was dissolved in an aqueous solution of TPA bromide and sodium hydroxide. Precipitated silica (NIPSIL VM3 manufactured by TOSOH Silica Corporation) was added to the obtained aqueous solution, and then an MFI zeolite serving as seed crystals was added to the resultant aqueous solution to prepare a raw material composition.

The chemical composition of the raw material composition was as follows:

SiO$_2$/Al$_2$O$_3$ molar ratio=88,TPA/Si molar ratio=0.10, Na/Si molar ratio=0.10,OH/Si molar ratio=0.10, and H$_2$O/Si molar ratio=40.

This raw material composition was reacted and treated in the same manner as in Example 1 except that the crystallization temperature was set to 160° C. to thereby obtain an MFI zeolite. The average particle diameter of the obtained MFI zeolite was 182 nm, and its SiO$_2$/Al$_2$O$_3$ molar ratio was 71. The total pore volume of mesopores present in the obtained MFI zeolite was 0.04 mL/g.

The peak-width at half height of uniform mesopores in the pore distribution curve of the obtained MFI zeolite was 0.2 nm, and the center value of the peak was 4 nm. The pore volume of the uniform mesopores was 0.02 mL/g, and the ratio of the pore volume of the uniform mesopores to the total pore volume of the mesopores was 48%.

The chemical composition of the raw material composition and the results of evaluation of the MFI zeolite are shown in TABLE 1.

Comparative Example 7

Aluminum hydroxide was dissolved in an aqueous solution of TPA hydroxide and sodium hydroxide. Tetraethoxysilane was added to the obtained aqueous solution, and then an MFI zeolite serving as seed crystals was added to the resultant aqueous solution to prepare a raw material composition. Ethanol generated was removed by evaporation.

The chemical composition of the raw material composition was as follows:

SiO$_2$/Al$_2$O$_3$ molar ratio=44,TPA/Si molar ratio=0.05, Na/Si molar ratio=0.25,OH/Si molar ratio=0.30, and H$_2$O/Si molar ratio=10.

This raw material composition was reacted in the same manner as in Example 1. However, only an amorphous solid was obtained, and the raw material composition was not crystallized.

TABLE 1

|  | STRUCTURE DIRECTING AGENT | OH/Si MOLAR RATIO DURING SYNTHESIS | SiO$_2$/Al$_2$O$_3$ MOLAR RATIO | AVERAGE PARTICLE DIAMETER (nm) | TOTAL PORE VOLUME OF MESOPORES (A) (ml/g) | UNIFORM MESOPORES ||| B ÷ A × 100 (%) |
|---|---|---|---|---|---|---|---|---|---|
|  |  |  |  |  |  | CENTER VALUE OF PEAK (nm) | PEAK-WIDTH AT HALF HEIGHT (nm) | PORE VOLUME (B) (ml/g) |  |
| Example 1 | TPAOH | 0.21 | 39 | 43 | 0.19 | 11 | 5 | 0.08 | 44 |
| Example 2 | TPAOH | 0.21 | 40 | 27 | 0.39 | 16 | 9 | 0.31 | 78 |
| Example 3 | TPAOH | 0.21 | 97 | 47 | 0.21 | 13 | 9 | 0.13 | 63 |
| Example 4 | TPABr | 0.17 | 62 | 57 | 0.14 | 10 | 6 | 0.06 | 44 |
| Example 5 | TPABr | 0.17 | 98 | 46 | 0.19 | 11 | 6 | 0.11 | 56 |
| Example 6 | TPABr | 0.17 | 26 | 26 | 0.42 | 17 | 15 | 0.39 | 92 |
| Comparative Example 1 | Na | 0.18 | 42 | 115 | 0.05 | 4 | 0.3 | 0.01 | 26 |
| Comparative | TPAOH | 0.26 | 48 | 60 | 0.17 | 25 | 32 | 0.17 | 100 |

TABLE 1-continued

| | STRUCTURE DIRECTING AGENT | OH/Si MOLAR RATIO DURING SYNTHESIS | $SiO_2/Al_2O_3$ MOLAR RATIO | AVERAGE PARTICLE DIAMETER (nm) | TOTAL PORE VOLUME OF MESOPORES (A) (ml/g) | UNIFORM MESOPORES | | | |
|---|---|---|---|---|---|---|---|---|---|
| | | | | | | CENTER VALUE OF PEAK (nm) | PEAK-WIDTH AT HALF HEIGHT (nm) | PORE VOLUME (B) (ml/g) | B ÷ A × 100 (%) |
| Example 2 | | | | | | | | | |
| Comparative Example 3 | TPAOH | 0.26 | 49 | 42 | 0.20 | 6 | 3 | 0.04 | 23 |
| Comparative Example 4 | TPAOH | 0.31 | 44 | 42 | 0.25 | 13 | 40 | 0.23 | 93 |
| Comparative Example 5 | TPABr | 0.17 | 217 | 46 | 0.04 | * | | | |
| Comparative Example 6 | TPABr | 0.10 | 71 | 182 | 0.04 | 4 | 0.2 | 0.02 | 48 |

\* NO CLEAR PEAK

As shown in TABLE 1, when no tetrapropylammonium cations acting as a structure directing agent are used, when the $SiO_2/Al_2O_3$ molar ratio in the crystals exceeds 200, or when the average particle diameter exceeds 100 nm, mesopores with a uniform pore diameter and a large pore volume, which are possessed by the MFI zeolites in the Examples, cannot be obtained.

(Catalytic Reaction)

A catalytic reaction was performed using polymerizable propylene as a reactant. The reaction conditions were set as follows.

Catalyst temperature: 400° C.

Circulation gas: a gas mixture of 15 mol % of propylene+ 85 mol % of nitrogen, 474 mL/min Ratio of the weight of introduced propylene to the weight of the catalyst: 4/hour Catalyst weight: 2 g Catalyst shape: pellets of about 1 mm obtained by molding MFI zeolite powder at 400 kgf/cm² for 1 minute and then pulverizing the molded compact Reaction tube: a quartz reaction tube with an inner diameter of 1.7 cm Detector: a flame ionization detector (FID) GC-14A manufactured by Shimadzu Corporation Column: a capillary column (Inter Cap 1, 30 m)

Gas chromatography conditions: nitrogen carrier 50 mL/min, sprit ratio 1:50

Comparisons were made on the conversion ratio of propylene and the yield of C5 or higher components, which are used as indicators of catalytic performance. In the present description, the C5 or higher components mean hydrocarbons having 5 or more carbon atoms. These values are computed as follows.

[Formula 3]

$$PC=100-(IP/EP \times 100) \quad (2)$$

In the formula (2), PC is the conversion ratio (%) of propylene, IP is the amount (mol/min) of propylene at a catalyst outlet, and EP is the amount (mol/min) of propylene at a catalyst inlet.

[Formula 4]

$$CY=EC/IC \times 100 \quad (3)$$

In the formula (3), CY is the yield of the C5 or higher components, EC is the carbon number (mol/min) of the C5 or higher components at the catalyst outlet, and IC is the carbon number (mol/min) of propylene at the catalyst inlet.

The carbon number of the C5 or higher components was determined by subtracting the area of the portion corresponding to components with carbon numbers of 1 to 4 from the total area detected by gas chromatography. The computation was performed by assuming that the FID sensitivity (the area per carbon number) of the C5 or higher components was the same as that of methane.

The MFI zeolite in Example 4 and the MFI zeolite in Comparative Example 6 were used for the reaction.

Figure 13:
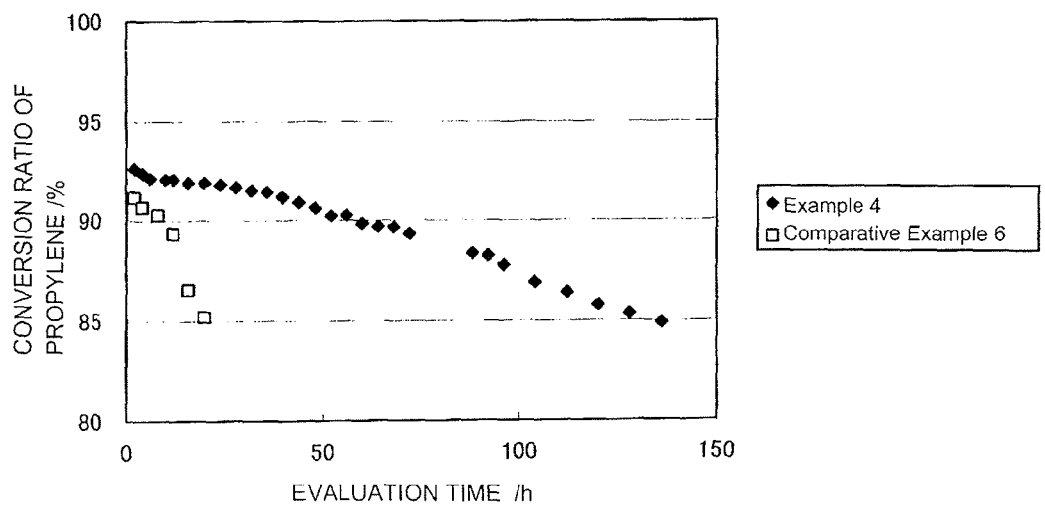
FIG. 13 shows a temporal change in the conversion ratio of propylene.
Figure 14:
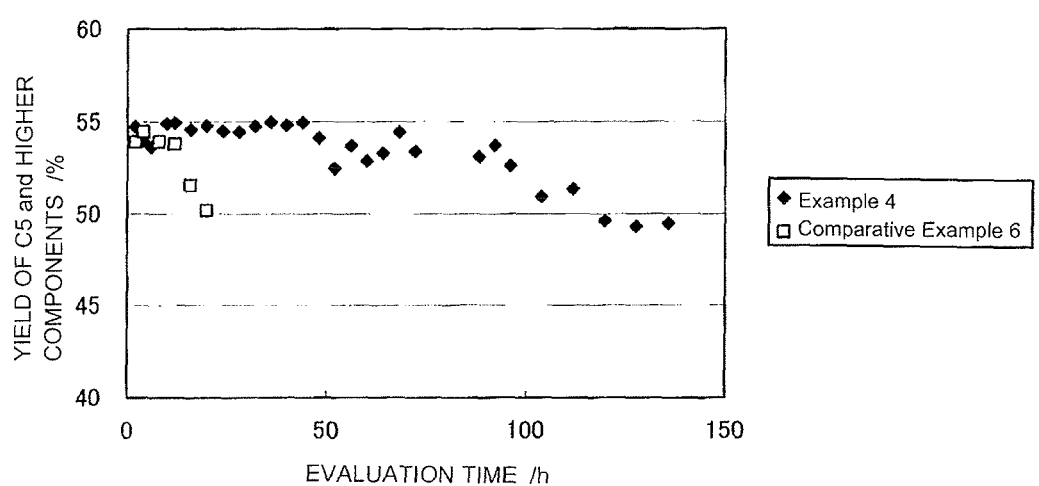
FIG. 14 shows a temporal change in the yield of C5 and higher components.

FIG. 13 shows a temporal change in the conversion ratio (%) of propylene, and FIG. 14 shows a temporal change in the yield (%) of the C5 and higher components. As can be seen from FIGS. 13 and 14, the conversion ratio of propylene and also the yield of the C5 and higher components were stable for a long time in the MFI zeolite in Example 4. However, in the MFI zeolite in Comparative Example 6, the conversion ratio of propylene and also the yield of the C5 and higher components decreased drastically. It may be understood that, in the MFI zeolite in Comparative Example 6, the pores are clogged with the generated propylene polymer.

INDUSTRIAL APPLICABILITY

The MFI zeolite in the above embodiment has mesopores with a uniform pore diameter and a large pore volume and is therefore suitable for, for example, a selective catalytic reaction for larger molecules.

The invention claimed is:

1. An MFI zeolite comprising the following properties:
   (i) the MFI zeolite includes uniform mesopores having a pore distribution curve which a peak-width thereof at half height (hw) is at most 20 nm (hw≤20 nm) and a center value (μ) of a maximum peak is 10 nm or more and 20 nm or less (10 nm≤μ≤20 nm), and having a pore volume (pv) of the uniform mesopores of at least 0.05 mL/g (0.05 mL/g≤pv);
   (ii) the MFI zeolite has no peak in a range of 0.1° to 3° in powder X-ray diffraction measurement with a diffraction angle represented by 2θ; and
   (iii) the MFI zeolite has an average particle diameter (PD) of at most 100 nm (PD≤100 nm),
   wherein an $SiO_2/Al_2O_3$ molar ratio is 39 or more and 200 or less (39≤$SiO_2/Al_2O_3$ molar ratio≤200).

2. The MFI zeolite according to claim 1, wherein the peak-width at half height (hw) is 10 nm or less (hw≤10 nm).

3. The MFI zeolite according to claim 1, wherein a ratio (pvr) of the pore volume of the uniform mesopores having the properties shown in (i) with respect to a total pore volume of mesopores is 30% or more and 100% or less (30%≤pvr≤100%).

4. A method for producing the MFI zeolite according to claim 1, the method comprising subjecting a raw material composition having the following chemical composition to hydrothermal synthesis:

0.03≤tetrapropylammonium cation/Si molar ratio;
OH/Si molar ratio≤0.22;
20≤$SiO_2/Al_2O_3$ molar ratio≤300; and
5≤$H_2O$/Si molar ratio≤20.

5. The MFI zeolite according to claim 1, wherein a ratio (pvr) of the pore volume of the uniform mesopores having the properties shown in (i) with respect to a total pore volume of mesopores is 30% or more and 100% or less (30%≤pvr≤100%).

* * * * *